July 25, 1961 T. T. BROUN, JR., ET AL 2,993,760
PROCESS FOR MANUFACTURING HYDROGEN PEROXIDE
Filed Dec. 14, 1956

INVENTORS
THOROWGOOD TAYLOR BROUN, JR.
CARL W. RAETZSCH and
BY JOSEPH R. MARES

Oscar L. Spencer
ATTORNEY

2,993,760
PROCESS FOR MANUFACTURING HYDROGEN PEROXIDE

Thorowgood Taylor Broun, Jr., Corpus Christi, Joseph R. Mares, Dickinson, and Carl W. Raetzsch, Corpus Christi, Tex., assignors, by mesne assignments, to Pittsburgh Plate Glass Company
Filed Dec. 14, 1956, Ser. No. 628,453
4 Claims. (Cl. 23—207)

This invention relates to the manufacture of hydrogen peroxide and pertains specifically to improvements in the process for making hydrogen peroxide in which a quinone passes successively through a reduction and oxidation cycle. The quinone reagent, whether in oxidized or reduced form, is sometimes referred to herein as the "carrier."

Heretofore, it has been proposed to dissolve a quinone, such as dimethyl anthraquinone, ethyl anthraquinone, tertiary butyl anthraquinone, etc. or the tetrahydro derivatives thereof, in a water immiscible solvent or mixture of solvents which is then carried through the following successive steps:

(1) Reduction of the quinone with elemental hydrogen in the presence of a suspended catalyst to produce the corresponding quinol.

(2) Separation by filtration of the suspended catalyst from the solution.

(3) Oxidation of the filtered solution with elemental oxygen (in the absence of catalyst) to evolve hydrogen peroxide and regenerate the quinone.

(4) Extraction of the hydrogen peroxide formed in step (3) with water and separation of the aqueous phase containing the hydrogen peroxide from the non-aqueous phase containing the carrier in solution which thereupon repeats the cycle with step (1).

In this sequence it is important that the catalyst shall be carefully removed from the organic solvent after the reduction step and before oxidation, otherwise it acts to induce unwanted reactions in the oxidation step with consequent loss of yield of peroxide. Inasmuch as the catalyst is made by precipitating palladium, for example, on a granular solid such as alumina, it is necessary to remove, before using, any fines that would not be removed in the catalyst separation step (2) above and also guard against the generation of fines as by abrasion or attrition during its normal use.

Furthermore, in selecting the solvent system and in view of the filtration step, it is important that the solvent be of a character as to hold the carrier in dissolved state not only in the quinone form but also in the reduced form of the quinone. The term "quinol" is used herein to cover the reduced form of the quinone and to include both the quinhydrone in which but one

group has been reduced and the hydroquinone in which both

groups have been reduced. Equally important: the solubility of the aqueous peroxide, resulting from step (4), in the solvent must be low, and the solubility of the solvent in the aqueous hydrogen peroxide must be low. Otherwise, loss of production and contamination of hydrogen peroxide products will result.

A better appreciation of the problem of selecting a solvent for the quinone is illustrated in the case of a system wherein dichlorobenzene is the solvent and 2-ethyl anthraquinone the carrier. These data are extended to include the tetrahydro ethyl anthraquinone and the corresponding quinols which are usually present during normal usage. In fact, these hydrogenated quinones are useful and for most purposes satisfactory equivalents inasmuch as they are reduced by hydrogen to form quinols and these, in turn, react with oxygen to form peroxide.

The solubility of the carrier in ortho dichlorobenzene, expressed as grams per liter of solution, is:

2-ethyl anthraquinone _____ 270
2-ethyl anthraquinol _____ 5.5
Tetra hydro-2-ethyl anthraquinone _____ 250
Tetra hydro-2-ethyl anthraquinol _____ 19

The marked difference in solubility of the carrier when in the quinone form from that in the quinol form has led to the use of mixed solvents, notably mixed aromatic hydrocarbons alone or in conjunction with ketones, alcohols or esters, in order to keep the quinol in solution. This in turn results in more dilute aqueous peroxide and introduces a contamination problem in step (4).

As will appear more fully hereinafter, the present invention provides and has as its object greater latitude in the selection of the non-aqueous solvent for the carrier to achieve high volume production in relation to the plant size, and makes possible the manufacture of hydrogen peroxide of any convenient concentration which may, if desired, be as high as 30 to 50 percent $H_2O_2$ by weight or higher, with lower losses of product and less contamination of aqueous peroxide by organic solvent contaminants.

According to this invention, hydrogen peroxide is prepared by reacting oxygen with a quinol in solid state. This may be done by introducing oxygen (including air) into a slurry of a solid quinol, such as solid 2-ethyl anthraquinol or like anthraquinol, suspended in an organic liquid. By virtue of this treatment, the quinol in solution is converted to the corresponding quinone and hydrogen peroxide is generated. As the dissolved quinol is converted to quinone, solid quinol dissolves, thus becoming available for reaction with further oxygen.

According to a further embodiment of the invention, the quinol in solid state may be suspended in a solvent which has a substantially greater solubility for the corresponding quinone than for the quinol. In such a case, the amount of quinol suspended in the solvent is substantially above the solubility of the quinol therein but is maintained below the concentration which corresponds in weight to the amount of the corresponding quinone in a saturated solution of said solvent. Thus, when the solid quinol is converted to the quinone, the resulting quinone dissolves substantially completely. This is especially advantageous since the resulting solution may be extracted with water to remove hydrogen peroxide and separated from the resulting solution more readily and more completely than in the case where the solid quinone must be separated from aqueous hydrogen peroxide.

The solid quinol may be prepared in any convenient manner. For example, a solution of a quinone, such as 2-ethyl anthraquinone, in an equivolume mixture of xylene and methyl cyclohexanol, may be hydrogenated to evolve the corresponding quinol and a portion of the solvent evaporated to produce a slurry containing the quinol in solid state suspended (as distinguished from dissolved). Alternatively, hydrogenation of a solution containing a high concentration of the quinone may be conducted until the amount of quinol therein appreciably exceeds the solubility of the quinol and the quinol precipitates. Preferably, the concentration of hydroquinone in solution and the degree of hydrogenation is such that the amount of precipitated quinol is at least one half of the amount dissolved.

There are a number of solvents which are capable of dissolving substantially larger amounts of the quinone than of the corresponding quinol. For example, the solubilities of the quinol (or hydroquinone) produced by hydrogenation of a solution containing the amount of anthraquinone in grams per liter set forth in the table, dissolved in a solvent mixture of 60 percent by volume diisobutyl carbinol and 40 percent by volume alpha methyl naphthalene at 30° C., is reported in the following table:

TABLE I

| Starting Anthraquinone | Starting Concentration of Anthraquinone, grams per liter | Solubility in grams per liter of the Anthrahydroquinone |
| --- | --- | --- |
| 2-ethylanthraquinone | 100 | 52 |
| 2-isopropyl anthraquinone | 175 | 43 |
| 2-secondary butyl anthraquinone | 175 | 80 |
| 2-tertiary butyl anthraquinone | 175 | 114 |

Other solvents which have higher solubility for the quinone than for the quinol are: chlorobenzenes, such as o-dichlorobenzene, trichlorobenzene; chloroaliphatic hydrocarbons, such as perchloroethylene, tetrachloroethane or ethylene dichloride; aromatic hydrocarbons, such as benzene, xylene, sec-butyl benzene, toluene, ethyl benzene, triethyl benzene or alpha methyl naphthalene, tetrahydronaphthalene and the like; ketones, such as diisobutyl ketone; ethers, such as n-hexyl ether; and esters, such as 2-ethylhexyl acetate, methylamyl acetate, methylcyclohexanol acetate or the like.

The following is a table showing solubilities of 2-ethyl anthraquinone (EAQ) and 2-tertiary butyl anthraquinone (TBAQ) in various solvents and the solubilities of the corresponding quinol in various solvents.

RELATIVE SOLUBILITIES OF ANTHRAQUINONES AND ANTHRAQUINOLS IN VARIOUS SOLVENTS AT 25° C.

| Solvent | Anthraquinone | Solubility of the Quinone Form in grams per liter | Solubility of the Quinol Form in grams per liter |
| --- | --- | --- | --- |
| Xylene | EAQ | 190 | 1 |
| Do | TBAQ | 364 | 8 |
| Toluene | EAQ | 207 | 1 |
| Do | TBAQ | 400 | 9 |
| 2-Ethylhexylacetate | EAQ | 55 | 25 |
| Do | TBAQ | 131 | 100 |
| Diisobutylketone | EAQ | 51 | 51 |
| Do | TBAQ | 118 | 83 |
| o-Dichlorobenzene | EAQ | 265 | 6 |
| Do | TBAQ | 256 | 19 |

During the hydrogenation herein contemplated, a side reaction tends to occur producing the corresponding tetrahydro derivative of the quinone by nuclear hydrogenation of the anthraquinone. Nearly all solvents for these tetrahydroanthraquinones dissolve much more of the quinone form than they do of the quinol (hydroquinone or quinhydrone) form.

According to this invention, a solution or suspension of carrier in its vehicle or solvent is intimately mixed with hydrogen while the solution or suspension is held in contact with a catalyst of such bulk that it can be readily separated from the resulting slurry by selective settling or filtration or by other means. Thus, the solution may be caused to impinge or react while in contact with a fixed catalyst which is held within the locus of a certain prescribed area and is restricted in its movement. Because of the restricted movement of the catalyst and the movement of the liquid, the solid precipitated quinol is separated therefrom, being carried along with the moving solvent, and is then agitated or contacted with air or oxygen. Hydrogen peroxide thus formed is recovered as an aqueous solution by countercurrent scrubbing with water. The addition of water during the oxidation step results in the direct formation of aqueous peroxide. In either case, the aqueous and non-aqueous phases are separated, after which the regenerated quinone-solvent mixture is returned to the reduction step.

The relationship of the several steps are illustrated in FIG. 1 of the drawing. To avoid a build-up of inert gas in the hydrogen, a bleed stream is withdrawn as indicated.

According to one embodiment, the reactor may be of centrifugal pump design, built to intimately mix the gas and liquid. The impellers of the pump and the internal surface of the pump housing are plated with palladium or other catalytic reducing surface. An alternate reactor design which may be used is illustrated in FIGS. 2, 3, 4, and 5 of the drawing, where:

Figure 1:
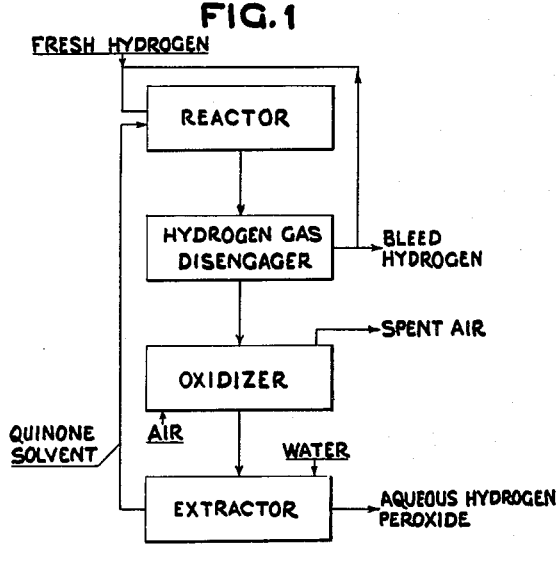

In this embodiment, a cylindrical vessel 1 is equipped with inlet port 2 for the liquid vehicle and the hydrogen and an exit port 3 to accommodate the reduced carrier, its vehicle, and the entrained hydrogen. A series of concentric palladium wire screen baffles 4 are secured to a liner 5 which fits inside the vessel. For ease of assembly, the head of the vessel is fabricated separately and flanged as shown at 6.

Figure 3:
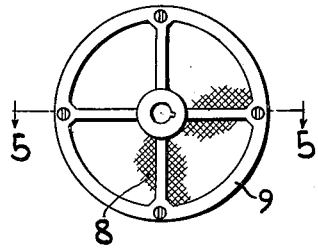
FIG. 3 is a diagrammatic plan view of a spider illustrated in FIG. 4.
Figure 4:
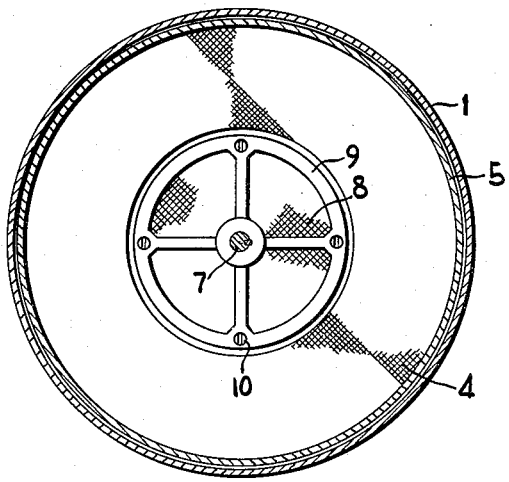
FIG. 4 is a horizontal view in section taken on line 4—4 of FIG. 2.
Figure 5:
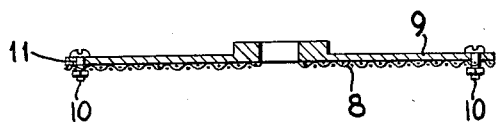
FIG. 5 is a vertical section taken on line 5—5 of FIG. 3.

A rotatable vertically mounted shaft 7 carries a series of palladium wire mesh screens 8, each secured to a spider 9 (see FIG. 3) which is keyed to the shaft in spaced relationship to the baffles 4 as shown. The screens are suitably secured to the spider as by means of bolts 10 which fit in holes 11 provided in the spider (FIG. 5). Sufficient clearance for assembly and operation is provided between the circumference of the screen 8 and the internal periphery of the screen baffle. The shaft and bearing assembly should be of such design and balance as to permit high speed rotation.

To operate the reactor, a solution containing the carrier in quinone state is introduced to partially fill the reactor, after which the agitator is started. Hydrogen is then introduced at a rate such that a mixture of hydrogen and liquid is carried out of the exit port into the disengager or entrainment separator. Thereafter, the flow of the quinone-solvent is commenced and controlled with respect to the flow of hydrogen to assure adequate residence time to reduce a substantial portion but preferably not all the quinone to quinol. When using a solvent such as orthodichlorobenzene, the reduction results in precipitation of quinol and the appearance of solids in the entrainment separator. The resulting suspension of solid quinol free of hydrogen entrainment is then subjected to oxidation by agitation with air, whereupon the solid "melts" or dissolves into solution thus indicating the conversion to quinone and hydrogen peroxide. After washing the oxidized solution with even a limited amount of water, the organic layer is freed of hydrogen peroxide and is ready to be returned to the reducer. We can, before returning the quinone solution into the reactor, pass it through a filter or clarifier although under normal conditions this is not necessary.

The use of a screen or like fixed catalyst is especially advantageous when the process is conducted under conditions heretofore described which cause precipitation of quinol during hydrogenation. Moreover, even when operating within the solubility limits of the quinol, this process avoids the difficulties of filtration, the cost of handling suspended catalyst in plant operation, and the loss of yield that results when reduction catalyst contaminates the oxidation cycle.

The following examples are illustrative.

Example I

Figure 2:
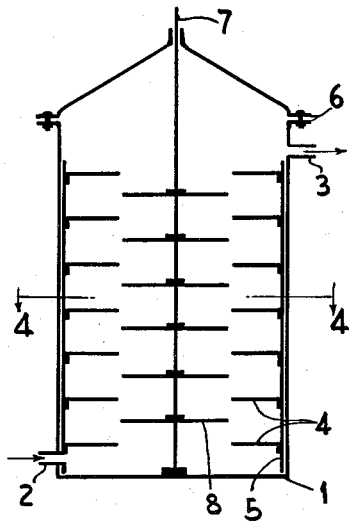
FIG. 2 is a diagrammatic vertical sectional view of a reactor of the type contemplated.

Orthodichlorobenzene which contains 210 grams per liter of 2-ethyl anthraquinone is placed in a reactor, illustrated in FIG. 2, containing palladium catalyst screen, and hydrogen is bubbled into the solution while maintaining the temperature of the solution at 25° C. until about 105 grams per liter of the anthraquinone has been converted to the quinol which precipitates. The resulting slurry of precipitated quinol is introduced into a tank and air is bubbled through the slurry while maintaining the slurry at a temperature of 25 to 30° C. until the suspended solids have been dissolved. The solution is then extracted with water in the proportion of 20 volumes of solution per volume of water. The resulting solution contains about 300 grams of $H_2O_2$ per liter of solution.

Example II 2-ethyl anthraquinone is dissolved in a solvent consisting of 15 parts by volume of triethyl benzene and 85 parts by volume of methyl cyclohexyl acetate to produce a solution containing 42 grams of 2-ethyl anthraquinone per liter of solvent, 100 gallons of this solution is placed in a hydrogenation chamber and circulation of further solution into and out of the chamber at a rate of 3 gallons per minute is begun. The solution is withdrawn through a filter to remove suspended catalyst.

After circulation is commenced, the chamber is purged with nitrogen. Thereafter, 5 pounds of metallic palladium catalyst on alumina carrier is suspended in the solution in the hydrogenation chamber and hydrogen gas is introduced into the solution at the rate of 6 to 7 cubic feet per minute measured at 760 millimeters' pressure and a temperature of 70° F., thus effecting hydrogenation of the quinone. The temperature of the solution undergoing hydrogenation is maintained at 80 to 100° F. Hydrogenation is continued until about 70–80 percent of the quinone is converted to quinol.

The solution removed from the hydrogenation chamber after removal of the catalyst is heated to evaporate solvent and to produce a slurry in which about one half of the quinol has precipitated. Thereafter, air is bubbled into the solution until the anthraquinone is completely regenerated, whereupon the solid disappears. The solution thus obtained is extracted with water to recover hydrogen peroxide.

Example III

One hundred milliliters of a saturated solution of 2-ethyl tetrahydroanthraquinone in α-methyl naphthalene is stirred with a catalyst which consists of 2 percent metallic palladium on active alumina which has a particle size of 10 to 35 mesh while bubbling hydrogen therethrough, the temperature of the solution being about 30° C. During this process, the corresponding quinol forms and precipitates in the solid state. After the quinol conversion has proceeded to about 50 percent of theoretical, the stirring is discontinued, whereupon the catalyst settles and a slurry of the quinol is decanted. Air is bubbled through this slurry at a temperature of 30° C. until the solids dissolve substantially completely. Thereupon, the solution is extracted with water.

The practice of the above process may be accomplished using any of the quinones which are commonly used or suggested for the production of hydrogen peroxide, including anthraquinone, 2-isopropyl anthraquinone, 2-secondary-butyl anthraquinone, 2-tertiary-butyl anthraquinone, 2-sec-amyl anthraquinone, 1,2-dimethyl anthraquinone, 1,3-dimethyl anthraquinone, 1,4-dimethyl anthraquinone, 2,7-dimethyl anthraquinone, and the like, and the corresponding tetrahydro derivatives of the above anthraquinones.

Although the present invention has been described with reference to the specific details of certain embodiments thereof, it is not intended that such details shall be regarded as limitations upon the scope of the invention except insofar as included in the accompanying claims.

What is claimed:

1. A method of preparing hydrogen peroxide which comprises introducing oxygen into a slurry comprising a solid anthraquinol suspended in an organic solvent which has a substantially greater solubility for the anthraquinone than for the anthraquinol, while maintaining the temperature of the slurry low enough so that the suspended anthraquinol remains in solid state, the amount of said anthraquinol in said solvent being substantially in excess of the solubility of said anthraquinol therein but below the amount which corresponds to the amount of the maximum solubility of the corresponding anthraquinone in said solvent, and continuing the introduction of oxygen into said slurry at least until enough anthraquinol has been converted to cause said solid to dissolve substantially completely in the solution.

2. In the process of preparing hydrogen peroxide by successively hydrogenating an anthraquinone to produce an anthraquinol, reacting the anthraquinol with oxygen to produce hydrogen peroxide and to regenerate the anthraquinone, extracting the hydrogen peroxide with water and recycling the anthraquinone, the improvement which comprises hydrogenating in the presence of a metallic palladium catalyst a solution of an anthraquinone in an organic solvent which has a substantially greater solubility for the anthraquinone than for the anthraquinol, the amount of said anthraquinone in said solvent being substantially in excess of that amount stoichiometrically equivalent to the solubility of the anthraquinone therein but below the stoichiometric amount which corresponds to the maximum solubility of the corresponding anthraquinol in said solvent, continuing said hydrogenation until a slurry of anthraquinol in said solvent has been produced, introducing oxygen into the resulting slurry while maintaining the temperature of the slurry low enough to keep the suspended anthraquinol in solid state whereby to produce hydrogen peroxide and regenerate the anthraquinol, continuing the oxidation until the anthraquinol has been substantially completely dissolved in the solvent, extracting hydrogen peroxide from the resulting solution, and recycling the resulting solution of anthraquinone.

3. In the method of preparing hydrogen peroxide by hydrogenation of an anthraquinone to produce an anthraquinol, the improvement which comprises hydrogenating a solution of an anthraquinone dissolved in an organic solvent which has a substantially greater solubility for the anthraquinone than for the anthraquinol, the amount of said anthraquinone in said solvent being substantially in excess of the amount corresponding to the solubility of the corresponding anthraquinol, conducting said hydrogenation while the solution is in contact with a wire screen having a surface of catalytic palladium metal while restraining movement of the screen and while maintaining the temperature of the slurry low enough so that a portion of the above anthraquinol remains in solid state, continuing the contact until a slurry of anthraquinol has been produced, withdrawing the resulting slurry from the catalyst, and reacting the resulting slurry with oxygen, and continuing the introduction of oxygen into said slurry at least until enough anthraquinone has been converted to dissolve the solids of the slurry and convert the slurry into a solution.

4. In the process of preparing hydrogen peroxide by successively hydrogenating an anthraquinone to produce an anthraquinol, reacting the anthraquinol with oxygen to produce hydrogen peroxide and to regenerate the anthraquinone, extracting the hydrogen peroxide with water and recycling the anthraquinone, the improvement which comprises hydrogenating the anthraquinone dissolved in an organic solvent which has a substantially greater solubility for the anthraquinone than for the anthraquinol and in the presence of a fixed metallic palladium catalyst whereby dispersion of the catalyst in the solvent-anthraquinone is prevented, maintaining the solution at a temperature at which the evolved anthraquinol is in solid state, and continuing the hydrogenation until a major portion of the anthraquinol formed has precipitated.

References Cited in the file of this patent

UNITED STATES PATENTS 2,059,569  Filson ----------------- Nov. 3, 1936
2,158,525  Riedl et al. ------------ May 16, 1939
2,804,376  Haller et al. ----------- Aug. 27, 1957

OTHER REFERENCES

Shanley: "Journal of Chemical Education," vol. 28, No. 5, page 260 (May 1951).

Ellis: "Hydrogenation of Organic Substances," 3rd edition, 1930, pages 378–379.